S. SZOSTAK.
REMOVABLE ELEVATING AND TURNING DEVICE.
APPLICATION FILED JAN. 6, 1916.

1,188,857.

Patented June 27, 1916.

Inventor
S. Szostak

By A. M. Wilson
Attorney

UNITED STATES PATENT OFFICE.

STANISLAW SZOSTAK, OF CHICAGO, ILLINOIS.

REMOVABLE ELEVATING AND TURNING DEVICE.

1,188,857.  Specification of Letters Patent.  Patented June 27, 1916.

Application filed January 6, 1916. Serial No. 70,650.

*To all whom it may concern:*

Be it known that I, STANISLAW SZOSTAK, a subject of the Emperor of Austria-Hungary, residing at Chicago, in the county of Cook and State of Illinois, have invented certain new and useful Improvements in Removable Elevating and Turning Devices, of which the following is a specification.

This invention relates to certain new and useful improvements in removable elevating and turning devices.

The primary object of this invention is the provision of a device permanently carried by a vehicle such as an automobile and whereby the same may be readily elevated off of the wheels thereof and then turned if desired.

A further object of the device is the provision of an elevating device that is easily manipulated from the driver's seat of an automobile whereby the vehicle may be raised above the ground in a position to be turned in any manner desired and whereby a vehicle may be turned around where there is insufficient room to drive the vehicle around in a circular path.

In carrying out these objects, a turn table arrangement is mounted upon the vehicle adjacent the driver's seat thereof and a removable operating crank is arranged for turning the same, so as to engage the roadbed and elevate the vehicle clear of engagement therewith and whereby the vehicle may be manually rotated, so as to face the desired direction and may then be lowered by reversing the movement of the crank.

With these general objects in view and others that will appear as the nature of the invention is better understood, the same consists in the novel combination and arrangement of parts hereinafter more fully described, illustrated in the accompanying drawings, and pointed out in the appended claim.

Figure 1:
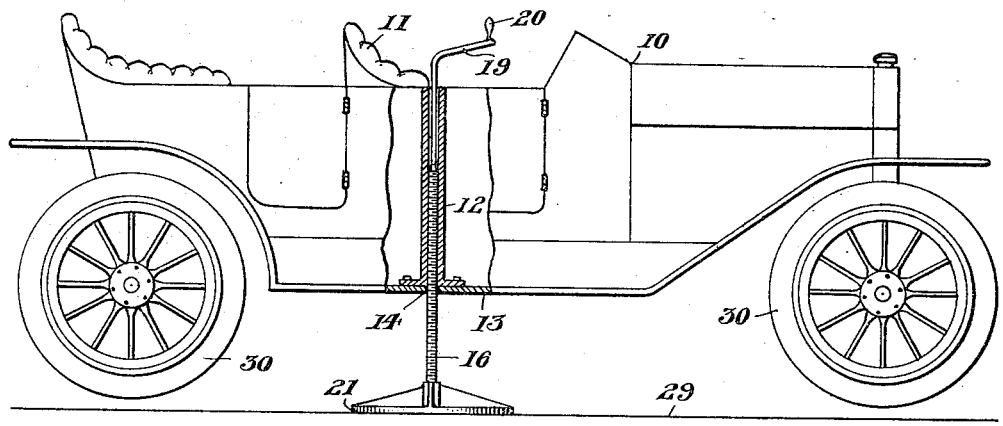
Figure 2:
Figure 3:
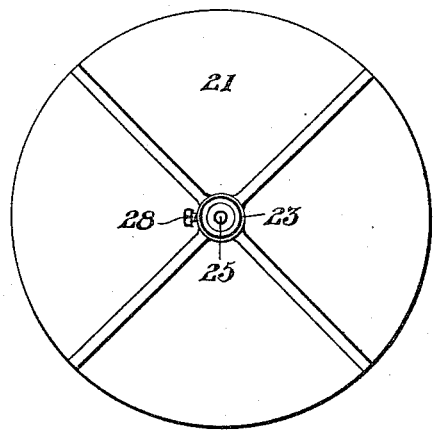
Figure 4:
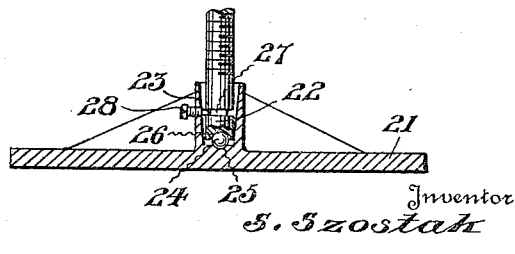

In the drawings forming a part of this application and in which like-designating characters refer to corresponding parts throughout the several views:—Figure 1 is a side elevation of an automobile provided with the present device, elements being broken away and the vehicle being illustrated in its elevated position. Fig. 2 is an enlarged detail view of the vehicle attaching portion of the device. Fig. 3 is a top plan view of the turn table support, and Fig. 4 is a central radial sectional view thereof, partially broken away.

It being understood that the present device may be employed in connection with any form of vehicle, the same is herein illustrated in connection with an automobile 10 having a forwardly arranged driver's seat 11.

An internally threaded mounting tube 12 is fixedly secured to the floor 13 of the vehicle at a point adjacent the driver's seat 11, the floor being arranged with a perforation 14 therethrough in alinement with the axial bore 15 of the said tube. An operating screw 16 is threaded within the bore 15 freely extending through the bottom perforation 14 and is provided with a wrench-hold squared reduced upper end 17 within the tube 12 and adapted to be engaged by the socketed end 18 of a crank wrench 19 having an operating handle 20 upon its opposite end.

A ground-engaging support or disk 21 is swiveled to the lower end of the screw 16 by arranging the lower end 22 of the screw 16 within a central socketed boss 23 carried by the disk 21. The boss 23 is flared outwardly and receives the said screw end 22 therein, the said end being anti-frictionally seated upon a ball 24 freely positioned in a semi-circular recess 25 in the bottom of the boss 23 and within a similar socket or recess 26 in the free end of the screw, as best illustrated in Fig. 4 of the drawings.

An annular groove 27 is provided with the said screw end 22 within which groove the inner reduced end of a screw-pin 28 is positioned, the latter being adjustably carried through the said boss 23.

From this detail description of the device the complete operation thereof will be apparent. The disk 21 is normally positioned elevated beneath and substantially in contact with the vehicle floor 13 and with the screw 16 withdrawn into the tube 12. When desired to elevate the automobile 10, the removable crank wrench 19 is inserted in the upper open end of the tube 12 and the socketed end 18 of the wrench engaged over the squared upper end 17 of the screw and by grasping the handle 20, the crank 19 is turned and the screw 16 revolved for projecting the same outwardly of the tube 12 thereby lowering the disk 21 into engagement with the roadbed or ground such as 29.

A further rotation of the screw 16 may be then accomplished and the disk 21 remaining stationary by reason of its contact with the ground, the automobile 10 will be elevated above the said ground, it being understood that the swivel connections 27 and 28 between the screw 16 and disk 21 allows this rotation of the screw, while the disk remains stationary. When the automobile is thus elevated, it will be seen that the wheels 30 thereof are free of the ground 29 and may remain in this position for storage or other purposes while the automobile may then be freely rotated upon the screw 16 for positioning the same in any desired direction. The flaring of the boss 23 allows a slight lateral movement of the disk 21 so as to accommodate the same to any unevenness of the road-bed, while the bottom of the said disk may be provided with engaging means or calks if found desirable.

It will be thus evident that a readily operable turn table is provided which may be easily carried by a vehicle and which may be also serviceable as a brake for retarding the movement of the vehicle if desired.

While the form of the invention herein shown and described is what is believed to be the preferred embodiment thereof, it is nevertheless to be understood that minor changes may be made without departing from the spirit and scope of the invention as claimed.

What I claim as new is:—

A device of the class described, comprising in combination with a vehicle body having a perforation through the floor thereof, a tubular member having a base flange secured to said floor, the bore of said tubular member being threaded throughout the length of the member and being in alinement with said perforation, said tubular member extending from the floor to the top of the vehicle body, a screw of the approximate length of the tubular member threaded therein to extend below the vehicle body and having a squared upper end, a disk swiveled on the lower end of said screw, and a crank having its shank extended into the upper end of the tubular member and detachably engaged with the squared upper end of the screw.

In testimony whereof I affix my signature.

STANISLAW SZOSTAK.

Copies of this patent may be obtained for five cents each, by addressing the "Commissioner of Patents. Washington, D. C."